O. R. DAVIS.
VALVE.
APPLICATION FILED JUNE 2, 1920.
1,412,927.
Patented Apr. 18, 1922.
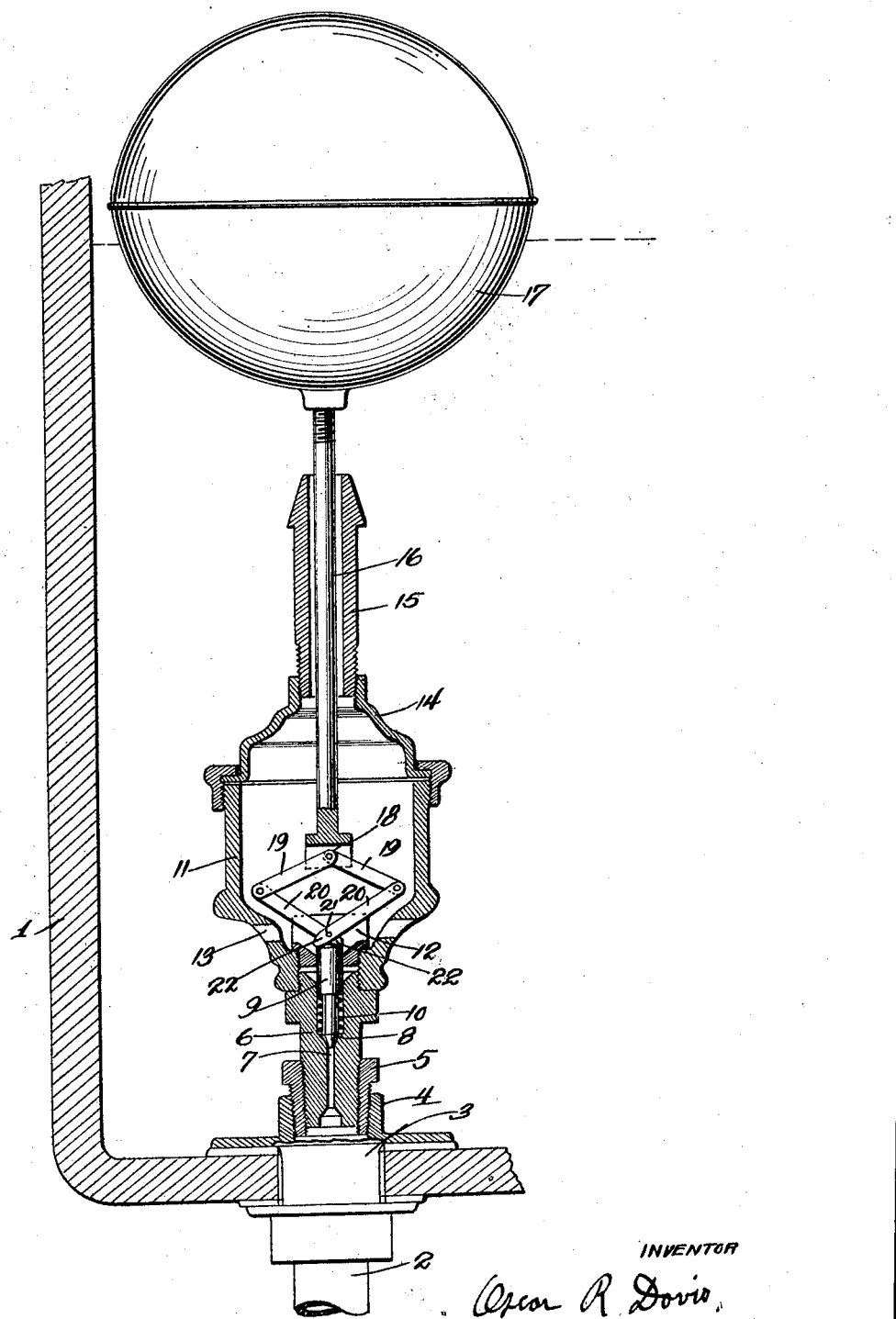
INVENTOR
Oscar R. Davis.

UNITED STATES PATENT OFFICE.

OSCAR R. DAVIS, OF POTTSTOWN, PENNSYLVANIA.

VALVE.

1,412,927.  Specification of Letters Patent.  Patented Apr. 18, 1922.

Application filed June 2, 1920. Serial No. 385,889.

*To all whom it may concern:*

Be it known that I, OSCAR R. DAVIS, a citizen of the United States, residing at Pottstown, in the county of Montgomery and State of Pennsylvania, have invented certain new and useful Improvements in a Valve, of which the following is a specification.

This invention relates to float valves and more particularly to the type of float valves employed in flush tanks.

The primary object of the invention is to provide a float actuated valve for flush tanks which will be constructed to eliminate the useful cross arm and pivoted float member.

Another object of the invention is to provide a float valve structure which may have various adjustments made to regulate the movement of the valve whereby it may be actuated when the water in the tank reaches a predetermined level to close the inlet to the flush tank.

Another object is to provide a valve of this character having all of its mechanism contained within a relatively small space adapted to be easily disconnected so that repairs, adjustments, and substitution of parts may be readily made.

Other objects of the invention will appear upon consideration of the following detail description and accompanying drawings, wherein:—

The figure indicates a vertical longitudinal section through the valve structure and a portion of the tank.

Referring to the drawing by numerals, the tank 1 has the inlet pipe 2 leading thereto and connected to the tank by a suitable coupling connection 3. A collar 4 is formed on this member 3 and is interiorly screw threaded to receive a removable screw threaded sleeve 5 within which the valve body or housing 6 is mounted. The valve body 6 comprises the screw threaded end adapted to be mounted in the member 5 and having a small inlet passage-way 7 provided at a point within the valve body with a taper valve seat to receive a conical valve member 8. This conical valve member is formed on the end of a removable valve pin 9 movable through a larger opening in the valve body and the valve member 8 is adapted to be moved out of engagement with its seat by a coil expansion spring 10.

A screw threaded reduced upper end, carries a housing 11 which also contains a removable guide member 12 for the upper end of the valve pin 9. The housing is provided with opposite outlet ports 13 whereby the water may be discharged into the tank when the valve is opened.

The housing 11 is provided with a removable top cap having a reduced upper end 14 which supports a guide sleeve 15 through which an extension rod 16 is extended. The ball float 17 is mounted upon the upper end of the extension rod and the lower end of the extension rod has a bifurcation through which a pivot pin 18 is extended. The pivot pin 18 connects the adjacent ends of two links 19 which are included in a toggle connection established between the extension rod and the guide member 12. The links 19 are connected at their ends to other links 20 which have their meeting ends connected to a centrally located pin 21 carried by the guide member 12 directly above the opening for the removel valve pin. The links 20, however, have pressure fingers extended beyond the pivotal connection 21 as indicated at 22 so that the pressure fingers may operate on the removable valve pin.

From the above it will be seen that the float will drop as the water level drops and the toggle joint connection will cause the pressure fingers 22 to disengage the removable valve pin whereby the spring will urge the pin upwardly and out of engagement with its seat thus permitting the water to flow into the tank. As the water level rises the float will also rise and operate on the links 19 and 20 so that the pressure fingers will press downwardly on the end of the valve pin, against the action of the spring 10 to close the valve seat by forcing the conical valve member into firm engagement with its seat. The opening and closing of the valve is controlled by movement of the ball float 17, said float being adjustable with respect to the extension rod 16, whereby the maximum level of the water in the tank may be regulated.

What I claim is:—

1. A float actuated valve mechanism comprising a valve housing having a conical valve seat, a removable valve pin provided with a conical valve member to engage the valve seat and having a spring tending to move the valve out of engagement with its seat, a guide member receiving the upper end of the valve pin to permit vertical sliding movement, the said guide member having a transverse pivot pin, links extending in opposite directions and having their meeting ends mounted on the said pivot pin of the guide member, pressure fingers formed on the ends of the links to engage the end of the said valve pin, a float provided with an extension rod carrying a pair of toggle links having their meeting ends connected together and their outer ends pivotally connected to the outer ends of the said first mentioned links whereby the said pressure fingers may operate on the valve pin when the float is raised and lowered.

2. A float actuated valve mechanism comprising a valve body having a conical valve seat, a removable valve pin provided with a conical valve member to engage the valve seat and having a spring tending to move the valve out of engagement with its seat, a guide member receiving the upper end of the valve pin to permit vertical sliding movement the said guide member having a transverse pivot pin, links extending in opposite directions and having their meeting ends mounted on the said pivot pin of the guide member, pressure fingers formed on the ends of the links to engage the end of the said valve pin, a float provided with an extension rod carrying a pair of toggle links having their meeting ends connected together and their outer ends pivotally connected to the outer ends of the said first mentioned links whereby the said pressure fingers may operate on the valve pin when the float is raised and lowered, the said valve body supporting a housing having outlet ports and embracing the said toggle links to restrict the downward movement of the extension rod by contact of the links with opposite sides of the said housing.

In testimony whereof, I have affixed my signature in the presence of two witnesses.

OSCAR R. DAVIS.

Witnesses:
BURNS M. JOHNSON,
E. LEON MAGEE.